United States Patent [19]

Roediger

[11] 4,378,886

[45] Apr. 5, 1983

[54] DECOMPOSITION APPARATUS WITH REVERSIBLE REMOVAL CONVEYOR

[75] Inventor: Hanns Roediger, Stuttgart, Fed. Rep. of Germany

[73] Assignee: Techtransfer GmbH & Co. KG, Stuttgart, Fed. Rep. of Germany

[21] Appl. No.: 186,068

[22] Filed: Sep. 11, 1980

[30] Foreign Application Priority Data

Sep. 20, 1979 [DE] Fed. Rep. of Germany ....... 2937965

[51] Int. Cl.³ .............................................. B07C 5/36
[52] U.S. Cl. .................................... 209/606; 209/942; 209/705; 435/813; 435/287; 414/327; 198/495; 198/497; 198/547; 222/148
[58] Field of Search ........................ 209/3.1, 942, 705; 198/495, 497, 499, 544, 547, 567, 862; 222/148, 415, 193; 435/287; 414/327

[56] References Cited

U.S. PATENT DOCUMENTS

| | | | |
|---|---|---|---|
| 2,748,993 | 6/1956 | Forrest | 222/415 |
| 2,788,927 | 4/1957 | Hoffstetter | 222/415 |
| 3,103,301 | 9/1963 | Pierson | 222/415 X |
| 3,199,655 | 8/1965 | Frazel | 222/415 X |
| 3,583,555 | 6/1971 | Karsnak | 198/495 |
| 4,073,376 | 2/1978 | Krooss | 198/495 X |

*Primary Examiner*—Allen N. Knowles
*Attorney, Agent, or Firm*—Sughrue, Mion, Zinn, Macpeak and Seas

[57] ABSTRACT

An apparatus for the aerobic decomposition of garbage, sludge, and similar organic waste materials having a reaction container (10) with vertically descending walls for the material to be decomposed, a discharge opening (12) extending over the entire cross section of the container (10), discharge elements (14) extending over the entire area of the discharge opening, and a removal device below the opening extending over the entire area of the discharge opening. A bi-directionally driven conveyor belt (16) transports the material to be removed from the discharge opening (12) into a first receptacle (22) which receives the material that has not been adequately purified or a second receptacle (24) for purified material. The conveyor belt (16) is preferably provided with cleansing devices (26).

8 Claims, 1 Drawing Figure

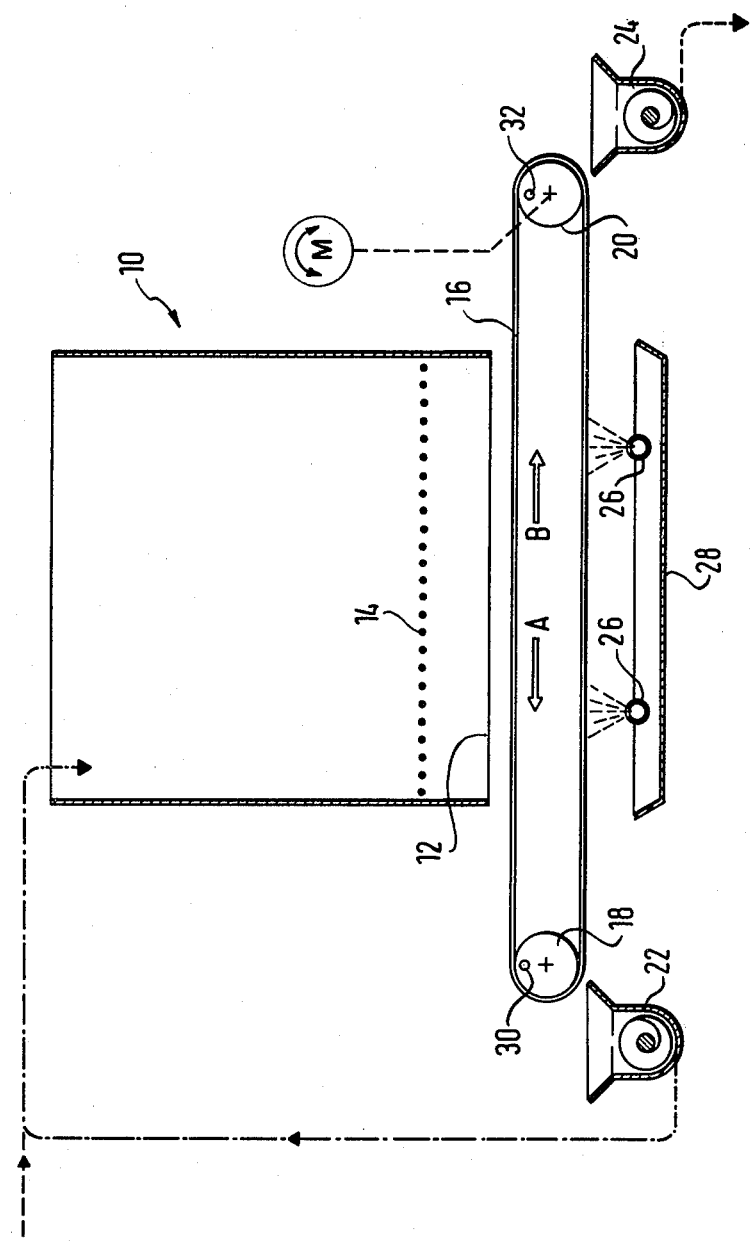

DECOMPOSITION APPARATUS WITH REVERSIBLE REMOVAL CONVEYOR

This invention relates to an apparatus for the aerobic decomposition of garbage, sludge or similar organic waste materials, said apparatus including a reaction container for the decomposing material with preferably vertically descending walls and a bottom discharge opening with discharge elements extending over the entire area of the opening and with a removal device below the opening extending at least across the entire area.

A similar apparatus is disclosed in German Auslegeschrift Nos. 1,250,844 and 2,559,162. The apparatus of the former has devices for stirring the discharge materials in a closed container. The material removed by a conveyor device in the area of the discharge opening of the container is removed from the container and fed back into it from above. The conveying device is an auger attached to rotate around the vertical central axis of the container. Such a device is not suited for alternately transporting purified material and material that is yet to be decomposed since there is no way to make sure that the auger is not still contaminated when the purified material is transported. If the conveyor device is used to transport contaminated as well as purified material then it must be thoroughly cleaned.

With other known decomposition containers the container walls come together to form a funnel-shaped section to provide a discharge opening which is small in relation to the cross section of the container above the funnel. Contaminated or purified material can be removed from this funnel opening. If purified material is removed from the discharge opening the inner container device must first be thoroughly cleaned by means of scraping or scouring devices. Then the conveyor device and the scouring device must also be thoroughly decontaminated. Another disadvantage of these known containers for decomposing material is that, due to the funnel-shaped construction of the discharge opening, the container is relatively tall in comparison to those reaction containers whose discharge openings cover the entire cross section of the container.

The object of the present invention is to provide an apparatus of the type mentioned above which allows contaminated and purified material to be removed from the container and transported sequentially, i.e. one immediately after the other, with a single device, without the danger of contaminating the purified material to be removed from the container, thereby simplifying the removal.

According to the invention the object is solved by extending the discharge opening over the entire or nearly the entire cross section of the container. The removal device is a conveyor belt which takes the material from the discharge opening to either a first device which takes up the material that has not been adequately purified or a second device for purified material. The first device can return the material into the reaction container. The conveyor belt is provided with cleansing devices which make rapid and thorough cleaning possible so that immediately or nearly immediately after transporting contaminated material, purified material can be transported, and vice versa.

The solution according to the invention teaches a method for conveying material removed from a decomposition container by means of a single conveyor apparatus which can be cleaned in a very simple manner and which simultaneously assures that this conveyor device is not recontaminated when transporting purified material. The cleansing device comprises a spray or rinsing device arranged in the area of the lower section of the conveyor belt and a collecting element which collects the cleaning medium. A scraping device can also be provided at a distance from the conveyor belt to scrape off the material and clean the belt. The scraping device can also provide a simple means of transporting the contaminated or purified material to the mentioned devices.

A further advantage of the invention is that the amount of material removed from the reaction container to be transported can be relatively large because the entire cross section of the container serves as a discharge opening. The amount of the material removed from the discharge opening depends, of course, on the extent to which the discharge elements arranged in the area of the discharge opening allow the material to pass. The discharge element can be known movable grids.

In a preferred embodiment of the invention the conveyor belt is arranged below the reaction container discharge opening so that it can be placed against the container opening to form a seal. This can be necessary if controlled amounts of air are to be added to the decomposing material. With an embodiment of this type the front rollers of the conveyor belt have preferably an eccentric rotation point to provide a simple manner of raising the conveyor belt to form a sealing closure of the discharge opening.

In another embodiment of the invention the conveyor belt is a permeable fabric belt, e.g. a filter belt, which can be rinsed in the area of the lower conveyor belt section from the side which does not make contact with the removed material. This type of cleansing provides at least as thorough a cleansing effect as the rinsing or spraying device mentioned above.

If the conveyor belt is moved around two return drums, material that has not yet been adequately purified can be removed in the area of the one return drum and material that has been adequately purified can be removed in the area of the other return drum. Therefore, in each case a device is arranged in the area of the conveyor belt return drums which takes up the purified material or the material which needs further decomposition.

Additional details, advantages and features of the invention will be seen from the schematically depicted embodiment shown in the drawing.

Reference number 10 illustrates a reaction container which holds the material to be decomposed and whose side walls are preferably vertically descending and change over into a discharge opening 12. In the area of the discharge opening there are discharge elements which preferably form a grid 14 with movably disposed elements (not illustrated in any further detail). The grid 14 provides that the desired amount of material can be removed from the container 10 through the discharge opening 12. Below the discharge opening there is a removal device in the form of a conveyor belt 16. This conveyor belt is driven by two conveyor drums 18, 20 whose direction of rotation can be reversed via motor M. In other words the conveyor belt 16 can be moved in direction A at one time and in direction B at another. In the areas where the conveyor belt turns there are devices 22 and 24 which can take up the material coming from the decomposition container 10. Material that is not adequately decomposed is transported in direction A into device 22 which can have an auger, for example. By means of the auger this material can be re-introduced into the container from above. This establishes a circuit which assures that the material in the reaction container 10 is indeed well decomposed and purified.

After the material in container 10 is adequately decomposed and purified it can be taken, also by way of the conveyor belt 16, to the device 24 from whence it moves to a storage station for fertilizer, for example. However, before the conveyor belt 16 is moved in direction B it is taken through a spray or rinsing device 26 located along the bottom section of the conveyor belt 16. Water partially mixed with a disinfectant is sprayed on the upper surface of the conveyor belt 16 so that it is totally freed of contaminated material. Steam or the like can also be used to clean the conveyor belt. After the cleansing has taken place the purified material can be transported to device 24 by moving the conveyor belt 16 in direction B without any danger of contamination. Below the discharge opening of the spraying or rinsing device 26 there is a collection pan 28 which can collect the cleansing medium and the particles rinsed from the conveyor belt 16.

The transport drums 18 and 20 have an eccentric rotation point 30 and 32, respectively, so that the conveyor belt 16 can seal off the discharge opening 12 if necessary. This can be the case when, for example, controlled amounts of air are to be introduced into the decomposition container 10. Of course, sealing off the bottom area of the decomposition container 10 by means of the conveyor belt 16 can also be accomplished in other ways, for example by a raising device by which the conveyor belt 16 with the associated conveyor drums 18 and 20 are raised as a unit.

What is claimed is:

1. Apparatus for the aerobic decomposition of garbage, sludge, and similar organic waste materials, said apparatus including a reaction container (10) for the material to be decomposed having vertical walls and a lower discharge opening with discharge elements (14) extending over the entire area of the discharge opening, and a removal device located below the discharge opening and extending at least across its entire width, characterized by: the discharge opening (12) extending over the entire cross-section of the container, a first receptacle (22) for material that has not been adequately purified, a second receptacle (24) for purified material spaced from said first receptacle, and the removal device comprising a reversible direction conveyor belt (16) disposed between said first and second receptacles for transporting material removed from the discharge opening (12) to either said first or second receptacles.

2. Apparatus according to claim 1, wherein the conveyor belt (16) is provided with cleansing devices (26).

3. Apparatus according to claim 2, wherein the cleansing devices comprise spray devices arranged in the area of the lower section of the conveyor belt (16) and surrounded by a collecting element (28) which collects a cleaning medium.

4. Apparatus according to claim 1 or claim 2, wherein the first receptacle (22) is located in the area of a first turning drum (18) for the conveyor belt (16) and the second receptacle (24) is located in the area of a second turning drum (20) for the conveyor belt.

5. Apparatus according to claim 1, further comprising means for bringing the conveyor belt (16) into sealing contact with the discharge opening (12).

6. Apparatus according to claim 4, wherein the first and second turning drums (18, 20) each have an eccentric rotation point.

7. Apparatus according to claim 1, wherein the conveyor belt is a permeable fabric belt, such as a filter belt, and further comprising means for rinsing said belt from a lower side thereof which does not come into contact with the material removed from the container.

8. Apparatus according to claim 1, further comprising means for returning material that is not yet adequately purified from the first receptacle (22) to the reaction container (10).

* * * * *